UNITED STATES PATENT OFFICE.

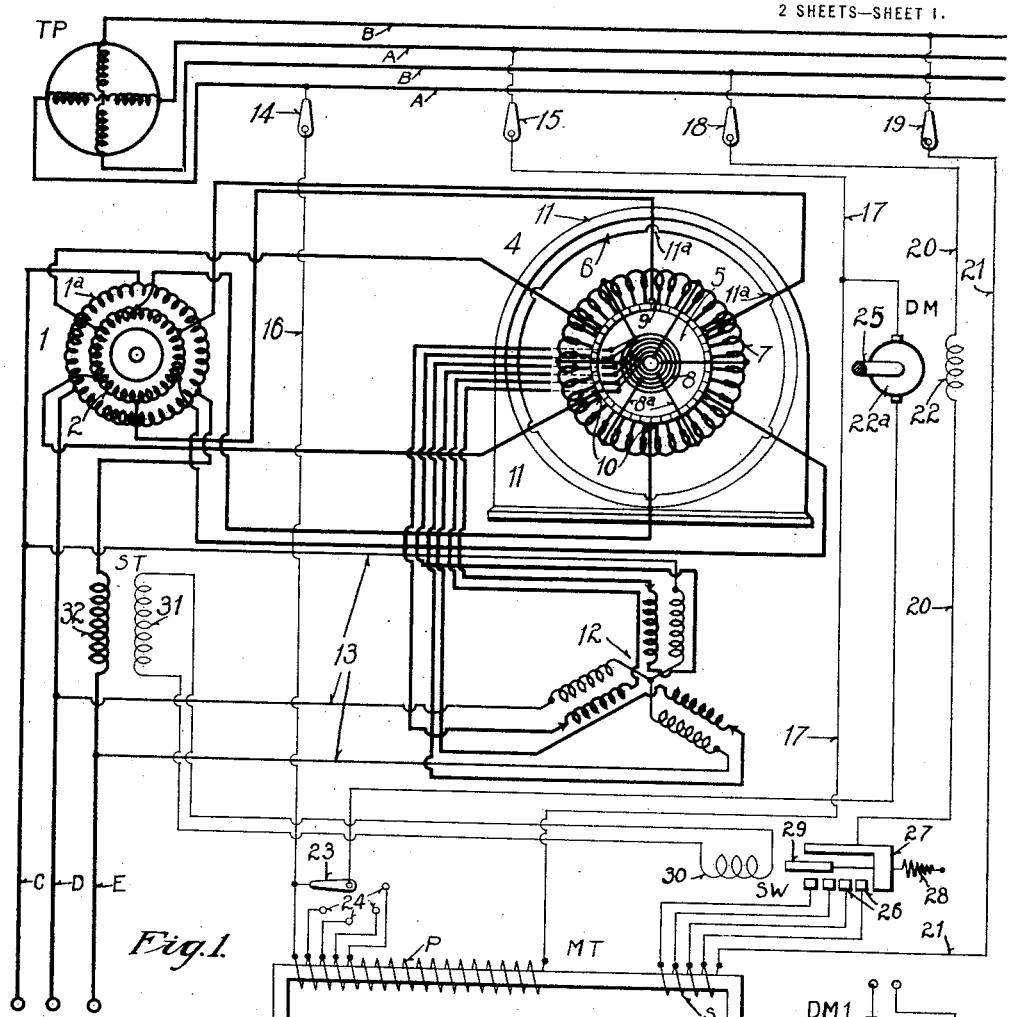

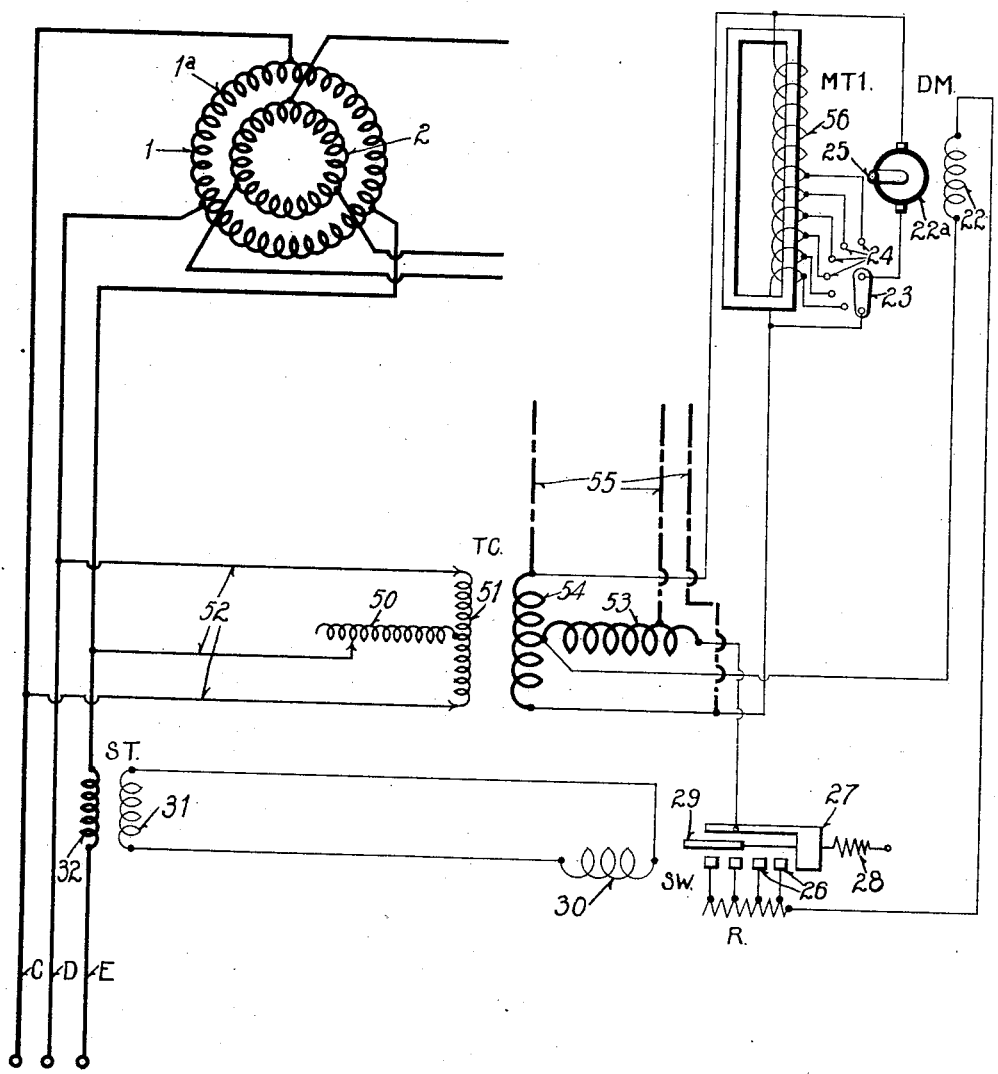

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,300,742.     Specification of Letters Patent.     Patented Apr. 15, 1919.

Application filed January 5, 1915. Serial No. 583.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Systems of Control, of which the following is a specification.

My invention relates to systems of control for dynamo-electric machines, and it has special reference to the speed control of induction motors.

In my co-pending application, Serial No. 819,717, filed February 19, 1914, I have shown and described a system of speed control for induction motors comprising a frequency converter having no field magnet coils and adapted to be connected to the supply circuit for the induction motor, and to convert the secondary-winding frequency to that of the primary winding and a variable speed driving motor for the converter. The induction-motor speed is thus regulated by returning energy to the supply circuit by means of the frequency converter.

The object of my present invention is to provide an economical driving motor for the above-indicated purpose which shall possess certain desirable inherent or automatic speed-regulating characteristics.

According to my present invention, I provide, in conjunction with the induction motor to be regulated and the frequency converter, as set forth in my above-identified co-pending application, a driving motor for the converter, and electro-responsive means, actuated in accordance with the load on the induction motor, for automatically varying the speed of the driving motor substantially in proportion to the "resistance slip" of the induction motor, that is, to the changes in the induction motor speed that occur in accordance with the variations in ohmic losses of the total secondary circuit, as the load on the induction motor changes.

In the normal operation of induction motors, the speed of the secondary or rotor winding tends to decrease, as the motor load increases, by an amount corresponding to the product of the resistance of the secondary circuit and the current flowing therethrough. However, when the above-mentioned frequency converter is employed, a counter-electromotive force takes the place of a portion of the drop in said resistance, the remainder including the resistance of the secondary winding, the frequency converter winding, brush contact, etc., and the resistance of any other auxiliary series-connected apparatus.

For the most stable operation, it appears that the induction motor should vary in speed, when controlled by the frequency converter, in substantially the same proportion as that mentioned above; namely, by an amount approximately in accordance with the respective ohmic losses in the total secondary circuit, as the motor load varies. Therefore, the frequency converter would have to vary in speed to a corresponding degree, and I provide means for rendering this action automatic. Thus, assuming that the frequency converter, which, at synchronism, delivers a current of zero frequency, is driven below synchronism to increase the frequency delivered to the induction motor secondary winding, then, with an increase in the load of the induction motor, the driving motor should automatically decrease in speed to a value approximately corresponding to the "resistance slip" of the induction motor. On the other hand, in case the frequency converter is driven above synchronism for giving the increased secondary-winding frequency, the driving motor should automatically rise in speed to the proper value, when an increase in the induction motor or load occurs.

The automatic variation in the speed of the driving motor just recited will be small relative to the wide range of speed which the motor must undergo for producing the desired speed adjustment of the induction motor. These two speed changes are, therefore, to a great extent, independent of each other, and should not be confused. Under the regulating conditions mentioned, any tendency of the entire set of machines to "hunt", is substantially avoided.

In the accompanying drawing, Figure 1 is a diagrammatic view of a system of control embodying my invention; Fig. 2 is a similar view of a modification of a portion of the system shown in Fig. 1, and Fig. 3 is a view of another system embodying my invention.

Referring to the drawings, the system here shown comprises a two-phase generator TP for supplying energy to a supply circuit having the phases AA and BB; a three-phase supply circuit having the phase conductors C, D and E for energizing an induction motor 1 having a suitable primary winding 1ª and a secondary winding 2 that is preferably disposed on the rotor 3, as is customary; a frequency converter 4; an auxiliary driving motor DM therefor; a transformer MT that is adapted to be connected to the two-phase supply circuit for energizing the motor DM; and an auxiliary transformer ST that is energized from the three-phase supply circuit and a switching device SW that are associated with the motor DM in a manner to be described. It will be understood that the particular type of induction motor, other than that it is provided with a phase wound secondary member, is not material to my present invention, and, consequently, further description thereof is not deemed necessary.

The frequency converter 4 comprises an armature 5 and a field-magnet ring or keeper 6. The armature is provided with a distributed winding 7 that is fed from a plurality of collector-rings 8 through taps 8ª having connection to suitably spaced points of the winding, the spacing being according to the number of phases for which the machine is designed. A commutator cylinder 9 has its segments suitably connected to the winding 7, and a plurality of current-collecting devices, such as brushes 10, the number of which corresponds to the number of phases of current, may be disposed at suitable intervals around the commutator cylinder 9.

The field-magnet ring or keeper 6, which is preferably constructed of laminated material, incloses the armature 5 and may be disposed within a frame 11, there being no field-magnetizing coils. A plurality of slots 11ª may be provided to suitably weaken the flux in the commutating zones and improve commutation.

The alternating-current supply system C, D, E, of the proper number of phases is connected to the collector rings 8 through suitable voltage-varying transformers 12 by a plurality of supply conductors 13. Leads corresponding to the several phases of current connect the various brushes 10 to the different phase windings, of any suitable type, of the secondary member 2 of the induction motor, the primary winding 1ª of which is connected to the three-phase supply system in any suitable manner. The transformer MT is shown as comprising a primary or main winding P that is connected across the phase AA of the two-phase supply circuit by means of a plurality of switches 14 and 15 and corresponding conductors 16 and 17, and a secondary or auxiliary winding S that is energized from the other phase BB, through the agency of a plurality of switches 18 and 19 and corresponding conductors 20 and 21, the switching device SW and a field magnet winding 22 of the motor DM being included in the connection 20. A manually operable switching arm 23 is associated with a plurality of taps 24 of the main winding P of the transformer MT for speed-regulating purposes in connection with the motor DM, as hereinafter set forth.

The auxiliary driving motor DM has its field winding 22 disposed in the manner just recited, and has a commutator-type armature 22ª that is connected between the conductor 17 and the manually operable switching arm 23. Any suitable mechanical connection, as a shaft 25, may be employed for coupling the driving motor DM with the frequency converter 4.

In the system shown, the operation of the auxiliary motor DM may be explained as follows: The motor armature is connected to the phase AA of the two-phase supply circuit, and, being relatively non-inductive, as compared with the field magnet winding, the armature current lags behind the impressed electromotive force by a relatively small amount. On the other hand, the relatively highly inductive field winding is energized from the other phase BB which is in quadrature relation to the phase AA, and the field current lags about 90° behind the voltage impressed from the phase BB. The resultant effect is that the exciting field and the armature currents are approximately in phase, which permits satisfactory operation of the auxiliary motor. The motor will thus provide substantially constant speed with moderate variations in torque, although its speed may be readily controlled by varying either the armature or field voltage. The switching device SW comprises a plurality of stationary contact members 26 that are tapped off from points in the winding S of the transformer MT; a coöperative movable contact member or brush 27 that is connected to the conductor 20; a spring member 28 for normally biasing the brush 27 to an inoperative position; and an electro-responsive device comprising a movable core 29 that is secured to the brush 27 and an actuating coil 30 that is energized from the secondary winding 31 of the auxiliary transformer ST, the primary winding 32 of which is series-connected in one of the phase-conductors E of the three-phase supply circuit.

The operation of the frequency converter may be described as follows: Assuming that the frequency-converter winding is suitably energized from the supply system, if the winding alone is rotated at synchronous speed, the alternating armature current generates a field fixed in space, the ring 6 serving merely as a keeper for the lines of force, as hereinbefore stated, and a current of substantially zero frequency is delivered from the commutator. A variation from synchronous speed causes a proportional change in the delivered frequency, which is also the frequency of flux variation in the keeper. If both the winding and the field magnet-ring rotate together, the frequency in the keeper will be the same as that in the armature core.

If the voltage supplied to the frequency converter is held constant and the speed is varied, the frequency obtained from the commutator is proportionately varied, always corresponding to the degree of departure from synchronous speed, but the voltage at the commutator end remains constant, or substantially proportional to that impressed upon the collector rings. As a result, it is possible to independently vary the voltage and frequency delivered to the secondary winding of the induction motor, the voltage being controlled by the regulating transformers, and the frequency being controlled by the speed of the frequency converter.

When the induction motor is at approximately synchronous speed, the frequency in its secondary winding is very low, and the voltage across the winding is substantially zero. Assuming, for instance, a slip of 2%, which signifies a secondary frequency of 2% of that in the primary winding, the frequency converter is operated to produce, from the commutator, a frequency of 2% of the supply-circuit frequency and a voltage of practically zero. That is, the frequency converter is run with no impressed voltage and at a speed corresponding to a 2% drop from synchronous speed, since the frequency delivered from the commutator varies in proportion to the departure from the speed of synchronism, as hereinbefore stated.

At 10% slip in the induction motor, part of the secondary voltage is employed in sending current through the secondary winding and the remainder must be compensated for by the frequency changer. The latter machine is therefore regulated to deliver 10% of the line frequency, that is, to run at 10% from synchronous speed, and at a voltage slightly less than the exact 10% voltage. Under these conditions, the induction motor may be operated at 10% below synchronous speed without rheostatic loss and at practically constant speed for all loads, if desired.

It should be noted that, at synchronous speed, the frequency converter delivers zero frequency at the commutator and that it may deliver frequency in accordance with its departure from synchronous speed and of the opposite rotation of phases when above synchronism to that when below. Consequently, by proper disposition of the phase relations, the induction motor may be operated above synchronism, provided suitable means are employed for passing the motor through synchronous speed.

Moreover, inasmuch as the frequency converter 4 forms no material part of my present invention except that it performs a necessary function in the control system, I have not deemed it requisite to describe the construction and operation of the converter in detail. Such construction and operation are fully set forth in my hereinbefore-identified co-pending application.

It will be understood that the induction motor 1 and the frequency converter 4 may be started into operation in any suitable and well-known manner. The speed of the driving motor DM may then be varied by manipulating the arm 23 that is associated with the main transformer winding P to set the converter speed at an appropriate initial value, which value may be varied to permit of relatively wide adjustment of the induction-motor speed as desired.

Assuming that the induction motor 1, the driving motor DM and the frequency converter 4 are all normally operating under predetermined load conditions, the operation of the induction-motor speed-controlling system, with particular regard to the driving motor DM, may be set forth as follows:

Upon a certain variation in the induction motor load, which entails a corresponding change in the induction-motor primary current that traverses the primary winding 32 of the auxiliary transformer ST, the current in the transformer secondary winding 31 is accordingly varied to change the excitation of the actuating coil 30 of the switching device SW, thereby including more or less, as the case may require, of the turns of the transformer MT secondary winding S in the field circuit of the driving motor DM. The design of parts is such that the thus effected speed variation of the frequency converter 4 corresponds approximately to the natural change in speed, that is, to the "resistance slip" of the induction motor alone by reason of the new load conditions, as hereinbefore explained. This automatic variation in frequency converter and induction-motor speed, as the induction-motor load changes, thus makes for stable and satisfactory operation. It will be appreciated that, in some cases, it may be desirable to increase the effect of the automatic speed regulation beyond that actually necessary, whereby the speed-characteristics of a series-wound commutator type motor may be approximated.

It will be understood that my invention is not limited to the use of the specific types of polyphase circuits illustrated, since, for example, in many cases, the induction motor and the auxiliary motor DM may be satisfactorily operated from the same supply circuit.

Reference may now be had to Fig. 2, which shows the two-phase supply-circuit AA, BB; a two-phase induction motor 33 having primary and secondary windings 34 and 35, respectively; a driving motor DM1 for the frequency converter (not shown); and an electro-responsive braking apparatus 36. Although, for the sake of simplicity and convenience, I have not shown the frequency converter, it will be understood that such a machine is employed in a similar manner to that set forth in connection with Fig. 1. Suitable regulating transformers, similar to 12, may also be employed, while the transformers MT and ST and the switching device SW are dispensed with.

The motor DM1 may comprise an armature 37 and a series-connected field magnet winding 38, although other suitable types of motor may be employed, if desired. Any familiar main speed-regulating method may be utilized for performing a function similar to that of the arm 23 and the taps 24 in the system illustrated in Fig. 1.

The apparatus 36 is, in general, similar to many types of electromagnetic brakes and may comprise a stationary base member 39, upon which are pivotally mounted the lower ends of a pair of annular complementary braking shoes 40 and 41, respectively; a wheel member 42 that is rigidly secured to the shaft 25 of the converter and rests within the shoes 40 and 41; a spring member 43 for biasing apart the upper end of the braking shoes to maintain them out of contact with the wheel member 42; and a pair of alined differentially-wound magnet coils 44 and 45 that are adapted to respectively employ, as a core, one of a pair of outwardly-extending projections 46 of the braking shoes, in collective opposition to the action of the spring 43. The coils 44 and 45 are series-connected in one of the phase-conductors for the primary winding of the induction motor 33. It will be understood that any other suitable form of braking apparatus may be employed, if desired. Moreover, a similar device may be employed to produce varying commutator-friction losses as the load current varies.

The purpose of this form of my invention is to provide a system wherein a change in the driving torque required of the induction motor correspondingly varies the speed of the auxiliary driving motor.

Assuming the various machines to be normally operating under predetermined load conditions, whereby the braking apparatus 36 exerts a certain correspondingly retarding effect upon the frequency converter and the auxiliary driving motor, the operation of the apparatus just described may be briefly set forth as follows:

When the induction-motor load varies and the current in phase AA of the supply circuit correspondingly changes, the current in the actuating coils 44 and 45 of the braking apparatus 36 is increased or decreased, as the case may be, to effect either a greater or a lesser retarding effect on the shaft 25, whereby the frequency converter and the auxiliary driving motor are varied in speed to correspond to the new value of the "resistance slip" of the induction motor, for a purpose already pointed out.

My system may be employed in conjunction with apparatus wherein the output of the frequency changer is of different phase number from the distributing system to which the unused energy of the induction motor is supplied by the use of suitable phase transforming means, thus providing a very flexible and adaptable control system.

Such a system is illustrated in Fig. 3, comprising the three-phase supply circuits C, D, E, induction motor 1, the frequency converter 4 (not shown), the transformer ST and the associated switching device SW, a resister R that is manipulated by the switching device, a regulating transformer TC of the familiar T-connected type, the driving motor DM, and a transformer MT1 that is suitably connected between the regulating transformer TC and the motor DM.

The transformer TC may comprise two primary coils 50 and 51, one terminal of coil 50 being connected to the mid-point of coil 51, and a plurality of conductors 52 respectively adjustably extend from the phase conductors C, D and E to the terminals of coil 51 and the 86.6% point of the coil 50, in accordance with familiar practice. The secondary winding likewise comprises two T-connected coils 53 and 54. Suitably connected three-phase conductors 55, shown in dot-and-dash lines for the sake of clearness, may extend to a three-phase rotor of the frequency converter (not shown) or the converter may be of any other appropriate type.

The terminals of coil 53 are connected through the field winding 22 of the driving motor DM and the switching devices SW, similarly to the system illustrated in Fig. 1, while the coil 54 is connected across the transformer MT1. The winding 56 of the transformer is connected to the armature 22$^a$ of the driving motor DM through the movable arm 23 which may engage any one of a plurality of taps 24, as also shown in Fig. 1.

Inasmuch as the operation of the driving motor DM, as controlled by the transformers MT1 and ST and the switching devices SW, is substantially identical with the operation set forth in connection with Fig. 1, no further exposition is deemed necessary.

It will be understood that various modifications in the structural details and arrangement of parts may be made without departing from the spirit and scope of my invention; I desire, therefor, that only such limitations shall be imposed as are indicated in the appended claims.

I claim as my invention:

1. In a system of control, the combination with a dynamo-electric machine having a primary and a secondary winding, of an auxiliary regulating machine connected to said secondary winding, a polyphase alternating-current supply circuit, a driving motor for said auxiliary machine having an armature and a field winding adapted for connection to different phases of the supply circuit, means for varying the armature voltage of said driving motor at will, and means for automatically varying the field voltage thereof, in accordance with the load on said dynamo-electric machine.

2. In a system of control, the combination with a dynamo-electric machine having a primary and a secondary winding, of an auxiliary regulating machine connected to said secondary winding, a polyphase alternating-current supply circuit, a driving motor for said auxiliary machine having coöperating stator and rotor elements adapted for connection to different phases of the supply-circuit, means for, at will, varying the voltage of one of said elements, and means actuated in accordance with the load on said first machine for automatically varying the voltage of said other element.

3. In a system of control, the combination with an induction motor having a primary and a secondary winding, of an auxiliary frequency converter connected to said secondary winding, a two-phase supply circuit, a driving motor for said converter having coöperating stator and rotor elements adapted for connection to the respective phases of the supply-circuit, means for varying the voltage of one of said elements at will, and means actuated in accordance with the induction-motor load for automatically varying the voltage of said other element.

4. In a system of control, the combination with an induction motor having a primary and a secondary winding, of an auxiliary frequency converter connected to said secondary winding, a two-phase supply circuit, a driving motor for said converter having an armature and a field winding respectively adapted for connection to the phases of said supply circuit, means for varying the armature voltage of said driving motor at will, and means actuated in acordance with the induction motor load for automatically varying the voltage of the field winding.

5. In a system of control, the combination with an induction motor having a primary and a secondary winding, of an auxiliary frequency converter connected to said secondary winding, a two-phase supply circuit, a driving motor for said converter having an armature and a field winding respectively adapted for connection to the phases of said supply circuit, means for varying the armature voltage of said driving motor to effect a relatively wide range of speed control of the induction motor, and electro-responsive means energized substantially in proportion to the load current of the induction motor for automatically varying the speed of the driving motor substantialy in proportion to the "resistance slip" of the induction motor.

6. In a system of control, the combination with an induction motor having a primary and a secondary winding, of an auxiliary self-excited frequency converter adapted to convert the secondary winding frequency to that of the primary winding, a two phase supply circuit, a driving motor for said converter having an armature and a field winding respectively adapted for connection to the phases of said supply circuit, switching means for varying the armature voltage of said driving motor to effect a relatively wide range of speed control of the induction motor, and electro-responsive switching means energized in accordance with the load current of the induction motor for automatically varying the speed of the driving motor substantially in proportion to the "resistance slip" of the induction motor.

7. The method of operating an induction motor from a source of alternating-current with an auxiliary source of alternating-current for determining the secondary frequency of said motor which comprises increasing said secondary supplied frequency with an increase in the load of said motor so as to cause the resultant speed-torque curve of said motor to approximate the speed-torque curve when undergoing the same load changes with the secondary winding closed through a resister.

In testimony whereof, I have hereunto subscribed my name this 29th day of Dec. 1914.

BENJ. G. LAMME.

Witnesses:
E. LIVINGSTONE,
B. B. HINES.